3,708,311
METHOD OF FRYING

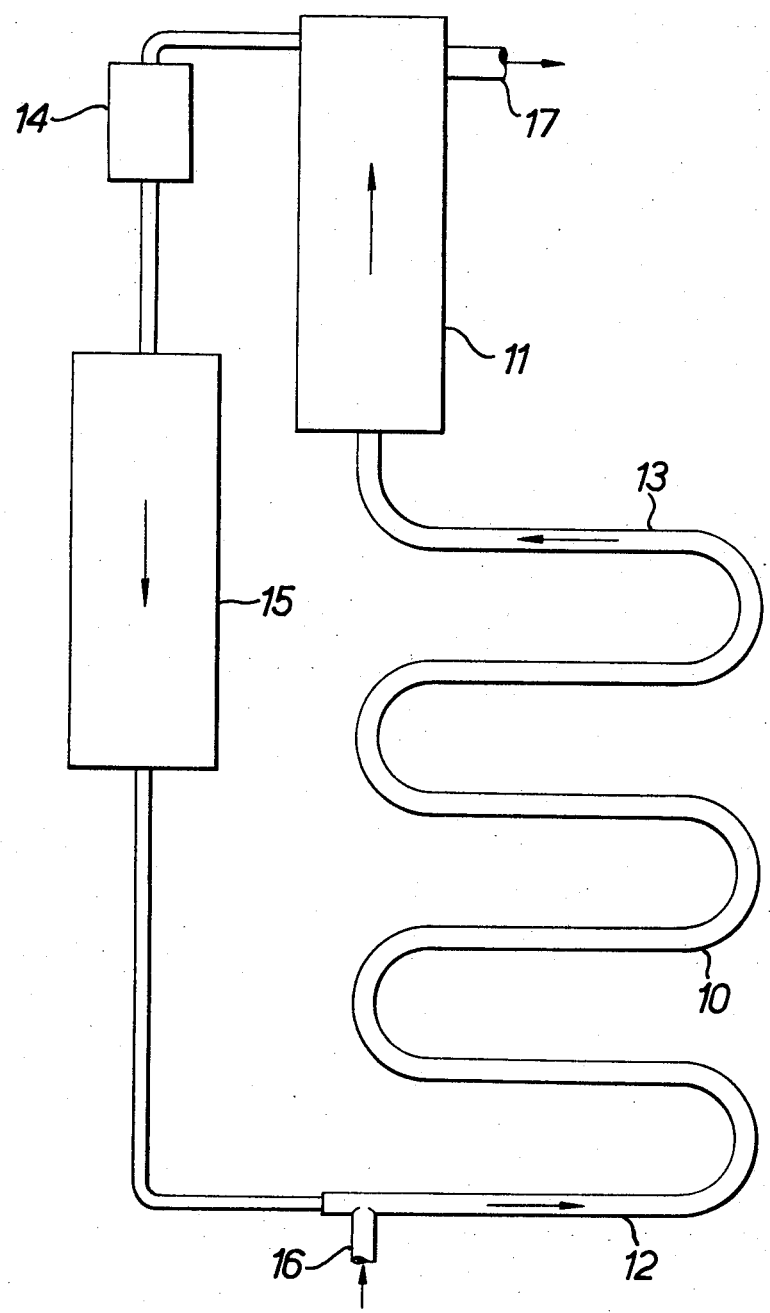

Andrew Bolton, Peter John Philpott, and Horace William Scoats, Bedford, England, assignors to Lever Brothers Company, New York, N.Y.
Continuation of application Ser. No. 639,138, May 17, 1967. This application Sept. 4, 1970, Ser. No. 69,980
Claims priority, application Great Britain, May 18, 1966, 22,201/66
Int. Cl. A23l 1/12
U.S. Cl. 99—100 P 4 Claims

ABSTRACT OF THE DISCLOSURE

Process for frying in which pieces of a foodstuff (i.e. potatoes) are passed into a stream of hot frying oil moving fast enough to carry them away and to keep them separate from each other, wherein they are sufficiently fried that they will not adhere to one another, finishing the frying in the second stage of the fryer and then removing them.

---

The invention relates to the frying of foodstuffs.

The invention is particularly applicable to the frying of potato products such as those described in our copending application Ser. No. 639,137, now abandoned, but may be applied to the frying of foodstuffs in general provided they are to be fried in convenient pieces.

According to the invention there is provided a process for frying a foodstuff, in which pieces of the foodstuff are passed into a stream of hot frying oil that is moving fast enough to carry the pieces away, and are carried in the stream until at least part of the frying process is completed. Conveniently the pieces of foodstuff are carried in the stream and kept largely separate from each other by it at least until the surface of the pieces has been hardened by the frying. Pieces of foodstuff which are initially sticky and tend to adhere to each other on contact can then be successfully fried, and satisfactorily even cooking is easier to attain.

The invention also provides apparatus for frying pieces of a foodstuff, having a feeding station for the pieces, a frying section, adapted to contain a stream of hot frying oil moving fast enough to carry the pieces away from the feeding station and keep them in the stream until at least part of a frying process has been effected, and means for removing the fried foodstuff from the frying section.

The frying process may be completed in the stream of oil, or alternatively the pieces of foodstuff may be carried by the stream of oil to a body of oil moving more slowly than the oil in the stream and in which the frying is completed. The frying section is then in two parts, the first part containing the oil stream and the second being the container with the static or slower moving oil.

The second part of the frying section preferably has a submerging conveyor to keep the pieces in the body of the oil.

The actual rate of flow of the stream of oil may be varied to suit both the rate at which the pieces are introduced into the stream and the volume of the oil in it as compared to that of the pieces. The oil stream may be caused to flow for example by applying a hydraulic gradient sufficient to cause the oil to flow under gravity. Alternatively, the stream may flow substantially horizontally, the flow being maintained by a pumped or differential head.

Even where the oil stream is moving relatively fast, there may be a tendency for the partly fried pieces to bunch and so form clumps before the surfaces have hardened. Various devices may then be employed, either to break up these clumps or to ensure, as far as is possible, that clumps do not form. For example the rate of oil flow may be increased or the path which the oil follows may be interrupted by protuberances in the stream to increase velocity locally and separate the pieces, so decreasing their tendency to stick together before the surfaces are hardened. Alternatively the oil may be made to flow in a tortuous path designed so that as the oil flows round the bends there is a tendency to disrupt any clumps of pieces. A particularly suitable method is to cause the oil to flow in a serpentine path so that the oil and pieces being fried travel round several bends, before the surfaces of the pieces are hardened. However, the oil may be agitated by any other means, for example an impeller, stirrer or screw device in the oil stream or oil injectors at one or more points in the oil stream, inducing local turbulence.

It is preferable that the pieces of foodstuff should be fried in an enclosed system, preferably one which is substantially free of oxygen gas, to minimize oxidative rancidity and other deterioration of the oil and of the fried product.

To achieve such a system the frying section or the part of the frying section containing the stream of oil may be a closed channel or pipe partly filled with the oil and provided, if necessary, with openings above the oil to allow for escape of excess steam released during the frying. The space above the frying oil may thus be kept substantially free of oxygen, for example partly by the steam and water vapour evolved in the early stages of frying and partly by flushing with an inert gas such as nitrogen or carbon dioxide.

Depending on the nature and properties of the foodstuff being fried, it may be convenient to employ a conveyor, as mentioned earlier, within the second part of the frying section. A particularly suitable form of conveyor has an endless belt of metallic mesh having a series of baffles integral with and located at right angles to the belt, which baffles are adapted to trap pieces of the foodstuff in the region of their entry of the second part of the frying section and convey them to the point where they are removed from the oil. It is further desirable to ensure, when such a conveyor is employed, that at least the lower section of the belt operates below the oil surface and thereto conveys the pieces of foodstuff within the body of the oil. Such an arrangement is particularly suited to the frying of pieces of foodstuff which are buoyant, and would tend to float during the final stages of frying.

It is understood that the friers as described in this specification may be used for frying food products, particularly buoyant food products, other than potato products. For example fruit fritters and other buoyant battered foods such as fish may be successfully fried.

It is convenient when the pieces of foodstuff are produced by extrusion and cutting of a mix to pass them directly into the stream of oil after the cutting. An example of such a foodstuff is reformed potato shaped as sticks.

Any suitable oil or fat may be used as frying medium. A particularly suitable oil is groundnut oil although cottonseed oil, corn oil or soybean oil may be used either individually or in admixture.

The temperature of the frying oil may be adjusted to suit the type, size and quantity of product being fried and will also depend on the desired residence time of the product in the oil. A suitable range of frying temperatures for use with the preferred type of frying apparatus when employing groundnut oil is 125°–195° C., although the actual temperature selected will depend on the nature of the foodstuff and the duration of the frying. Thus, for example, a potato dough containing about 35% solids by weight extruded in stick form may conveniently be surface-hardened by frying in oil at a temperature of about 140°–145° C., the frying then being completed at a temperature of about 130–135° C. Conversely when frying thin potato circles or other shapes of a potato dough containing about 50% solids by weight it has been found convenient to apply an initial frying temperature of about 130° to 135° C. and then, when the pieces are surface hardened, to apply a temperature of about 140°–145° C. to complete the frying.

Embodiments of frying apparatus of the invention are described with reference to the accompanying diagrammatic drawings in which:

FIG. 2 is a block diagram of apparatus with a single oil-circulation system suitable for the same purpose.

Figure 1:
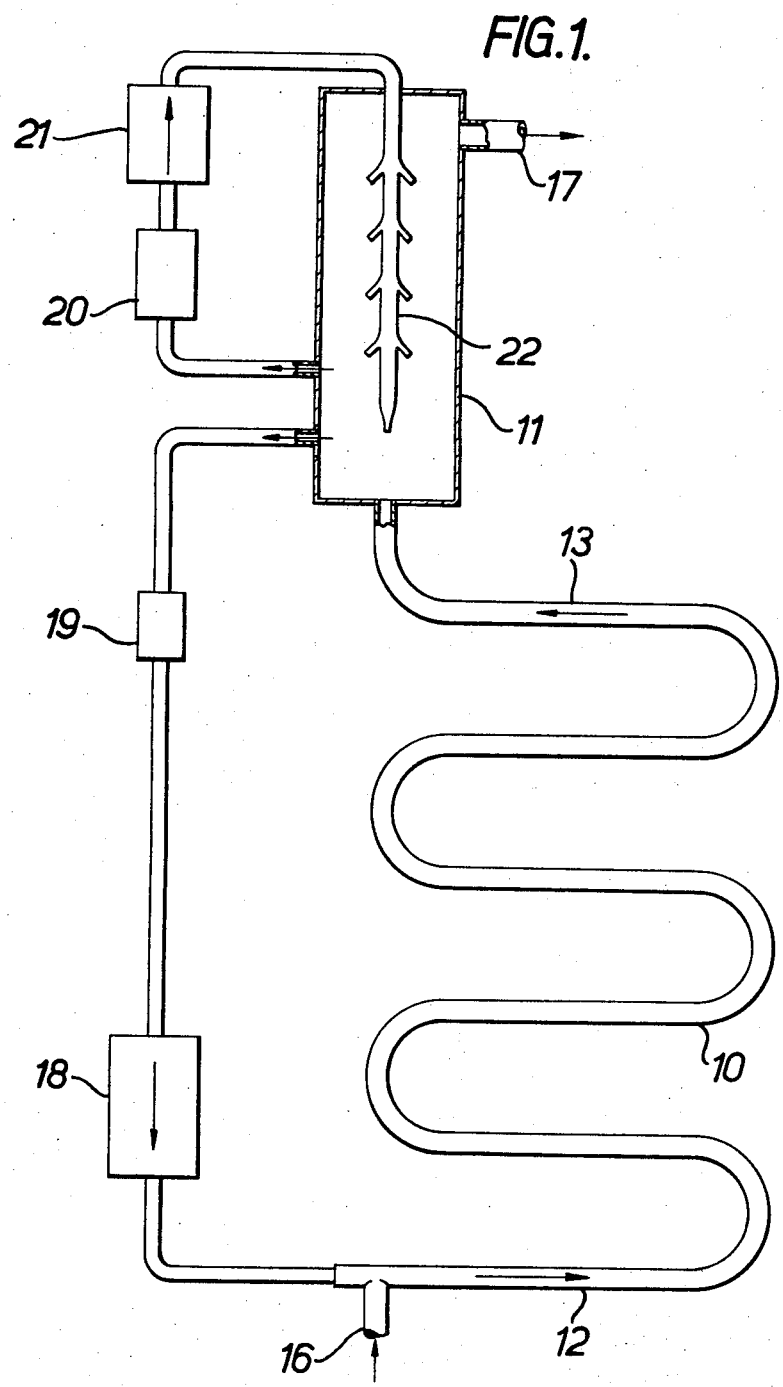
FIG. 1 is a block diagram of apparatus with a double oil-circulation system suitable for frying potato sticks and circles.

The frying apparatus illustrated in FIG. 1 comprises a first part 10 of a frying section, which is a 35 metre length of 10 cm. diameter pipe bent to a serpentine form, and a second part 11, which is an elongated closed horizontal trough. As shown in FIG. 1, the trough, or first part, has a larger cross-sectional area than does the channel, or second part. The distal limb 13 comprises a means communicating the first part with the second part of the apparatus for discharging oil from the first part. As additionally shown in FIG. 1, a conduit comprises a return means for returning the oil from the trough to the first part. As shown, the downstream end (with respect to the direction of the returning oil flow) is so positioned to provide a means for receiving or feeding the returning oil into the leading limb of the first part of the apparatus. A pump means (19) positioned in the return flow means between the second and the first parts for moving the oil out of the trough is shown in FIG. 1. The first part 10 is inclined so that the leading limb 12 of the serpentine is slightly higher than the distal limb 13, and so that the first part as a unit has a hydraulic gradient of 1 in 120. Hot oil enters the leading limb from a first heat exchanger 18 and flows under gravity through the first part of the frying section and into the second part. From there some of the oil is pumped via a first pump 19 back to the first heat exchanger 18 where it is reheated. It is then returned to the first part of the frying section. Some of the oil in the second part of the frying section is pumped via a second pump 20 to a second heat exchanger 21 where it is reheated and is then returned via a manifold 22 which ensures thorough mixing of the oil thus maintaining an even oil temperature throughout the second part of the frying section. Such a manifold is however an optional feature.

The product to be fried, for example pieces of shaped potato dough enters the upper end of the first part of the frying section via a port 16 and is carried in the hot oil stream to the lower end where it passes in a partly fried and surface-hardened condition into the second part 11. The second part 11, which is partly filled with hot oil, is fitted with a submerging conveyor and an elevating conveyor system (not shown) for moving the fried pieces through the oil and then up to an exit port 17, where they are removed for centrifuging; dusting for example with a salt/monosodium glutamate mixture; and packaging.

The alternative frying apparatus illustrated in FIG. 2 comprises a first part 10 of a frying section, which is a 35 metre length of 10 cm. diameter pipe bent to a serpentine form, and a second part 11, which is an elongated closed horizontal trough. The first part 10 is inclined as before so that the leading limb 12 of the serpentine is slightly higher than the distal limb 13, the first part 10 as a unit having a hydraulic gradient of 1 in 120. The leading limb is adapted to receive hot oil from a heat exchanger 15 via a pump 14. The oil flows under gravity down the inclined first part 10 and via part 11 back to the heat exchanger 15 where it is reheated and is then returned to the first part 10.

Provision is also made (not shown) for flushing the system with an inert gas (nitrogen). The inlet and outlet 16 and 17, and conveyors, are as before. In both sets of apparatus filters may be provided to clean the oil before it enters the pumps.

As an alternative to the arrangement of FIG. 1 the oil stream may be divided after leaving the heat exchanger 21, the oil going in part back to the second part of the frying section and in part through a further pump and heat exchanger as before to the first part of the frying section.

We claim:
1. A process for the frying of pieces of a foodstuff which normally tend to adhere to each other comprising the steps of:
   (i) causing a stream of hot frying oil to circulate through a two-part frying system, said system comprising a first and a second part, said oil flowing more slowly through said second part than through said first part,
   (ii) introducing pieces of foodstuff, which normally tend to adhere to each other, into said circulating oil at a feeding station in said first part, at a rate such that, when compared to the rate of circulation of oil, the pieces of foodstuff are carried into said stream and kept separate from each other at said feeding station,
   (iii) inducing turbulence in said cooking oil in said first part thereby further decreasing the tendency of said pieces of foodstuff to adhere before surface hardening,
   (iv) continuing the circulation of hot oil and the carrying of said pieces of foodstuff in the hot oil in said first part for a time at least sufficient to surface-harden said pieces of foodstuff,
   (v) passing said oil and surface-hardened pieces of foodstuff out of said first part and into said second part, and completing the frying of said pieces of foodstuff in said second part, and
   (vi) removing said pieces of foodstuff from said second part.

2. A process in accordance with claim 1 wherein said hot oil is at a temperature of about 125° C. to about 195° C.

3. A process in accordance with claim 1 wherein the turbulence is induced by causing the oil and pieces of foodstuff to follow a serpentine path.

4. A process in accordance with claim 1 wherein the turbulence is induced by mechanically agitating the oil.

References Cited

UNITED STATES PATENTS

| | | | |
|---|---|---|---|
| 1,520,860 | 12/1964 | Denz | 99—406 |
| 1,531,256 | 3/1925 | Morrow | 99—406 |
| 2,207,316 | 7/1940 | Ferry | 99—100 |
| 2,861,514 | 11/1958 | Sech | 99—406 |
| 3,215,094 | 11/1965 | Oldershaw et al. | 99—1 |
| 3,282,197 | 11/1966 | Smith | 99—100 |
| 2,057,366 | 10/1966 | Chapman | 99—404 X |

A. LOUIS MONACELL, Primary Examiner

W. A. SIMONS, Assistant Examiner

U.S. Cl. X.R.

99—1, 403, 100